April 28, 1925.

C. W. MORTIMER 1,536,027

METHOD OF MAKING SHINGLE STRIPS

Filed Feb. 1, 1922

INVENTOR

Charles W. Mortimer

BY

ATTORNEY

Patented Apr. 28, 1925.

1,536,027

UNITED STATES PATENT OFFICE.

CHARLES W. MORTIMER, OF BROOKLYN, NEW YORK.

METHOD OF MAKING SHINGLE STRIPS.

Application filed February 1, 1922. Serial No. 533,227.

*To all whom it may concern:*

Be it known that I, CHARLES W. MORTIMER, a citizen of the United States, residing at Brooklyn, in the county of Kings and State of New York, have invented certain new and useful Improvements in Methods of Making Shingle Strips, of which the following is a specification.

In Patent Number 1,516,238, issued November 18, 1924, I have described a strip of roofing material of such a shape that material may be saved by the invention, and I have also described the process of cutting such strips from a sheet of roofing material. By the present invention I am enabled to produce a shingle strip of a similar sort without any waste of material by a different method of cutting the roofing strips.

Figure 1:
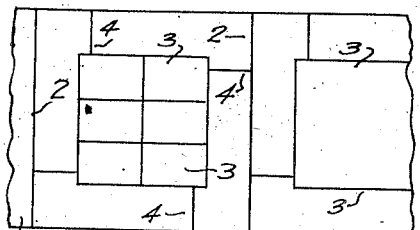
Figure 2:
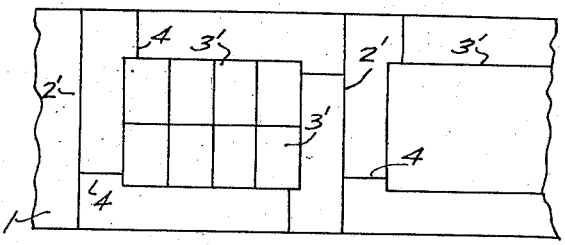

The invention will be understood by reference to the accompanying drawings, together with the description, in which Fig. 1 shows a method of cutting the shingles; and Fig. 2 shows a similar method by which the strips are cut so as to be of a slightly different shape.

Figs. 3, 4, 5 and 6 show different methods of cutting shingle strips differing somewhat in shape from those shown in Figs. 1 and 2.

In Figs. 1 and 2 of the drawings reference character 1 indicates a sheet of roofing material which may be cut into squares along the lines 2, 2 or rectangles along the lines 2', 2', from which squares or rectangles smaller squares or rectangles may be cut along the lines 3, 3 and 3', 3', the sheet also being cut along the lines 4 parallel with the lines 2 and 3 or the lines 2' and 3',a short distance from the corners made by the lines 3 or 3'. The inside smaller square or rectangle may be then cut into individual rectangularly shaped shingles of standard size. Notches may be cut in the edges of the strips that are to be exposed to the weather when the strips are installed on a roof, or the exposed surfaces may be ornamented in various ways already known in this art.

As an example, when a roofing sheet 1, 40 inches wide, is used, the lines 4 may be spaced 10 inches from the lines 2 or 10 inches from the sides of the roofing sheet 1, while the lines 3 are spaced 8 inches from the lines 2 on the sides of the roofing material, thus producing shingle strips having a portion 10 inches wide and 8 inches long, together with a portion 8 inches wide and 30 inches long, as shown in Fig. 1. With these dimensions the smaller square will be 24 inches by 24 inches, thus making it possible to cut therefrom six rectangular shingles 8 inches by 12 inches. By making the lines 3 that are parallel to the edges of the sheet 1 an inch and a half longer, standard size shingles 8 inches by 12¾ inches can be cut out, thus correspondingly changing the length of half the strips. Other changes in the dimensions may be made without departing from the spirit of the invention.

In the modification indicated in Fig. 2, the same principle is applied, but the interior cut-out portion instead of being a square may be made with its length greater than its width, thus correspondingly changing the length of the narrow portions of the shingle strips of the new type and making it possible to obtain a greater number of rectangular shingles from the inside cut-out portion.

In the modifications shown in Figs. 3, 4, 5 and 6 the strips may all be of the same shape cut without waste from sheets of the same width by the different methods as indicated, the entire sheet being utilized for making the shingle strips.

Figure 3:
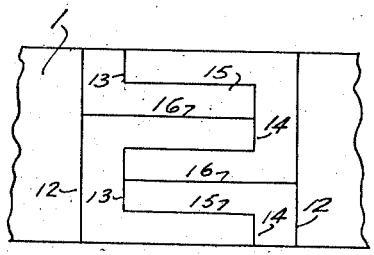

In Fig. 3 reference character 1 indicates a sheet of roofing material that is to be cut transversely along the lines 12, 12, and also along the lines 13, 13 and the lines 14, 14, while the same is to be cut longitudinally along the lines 15 and 16.

Figure 4:
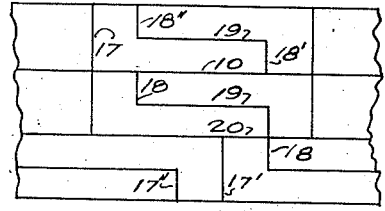

A different way of cutting out the shingles is indicated in Fig. 4, the sheet to be cut transversely along the lines 17, 17', 17'' and also along the lines 18, 18', 18'', while the same is to be cut longitudinally along the lines 19 and 20.

Figure 5:
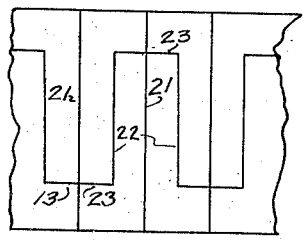

Fig. 5 shows a different method of cutting out the shingles, in which the sheet 1 is cut transversely along the lines 21 and the lines 22, while the same is cut longitudinally along the lines 23.

Figure 6:
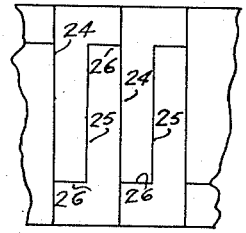

Fig. 6 shows a different method, in which the sheet 1 is cut transversely along the lines 24 and 25, while the same is cut longitudinally along the lines 26.

In Figs. 3, 4, 5 and 6 the shingle strips are made with the wide portion twice the width of the narrow portion and the wide portion may be made of various lengths with respect to the narrow portion, the preferable length being such that the wider portion is about one-fourth the total length of the shingle strip. The edge of the shingle strip that is to be exposed to the weather when the strip is installed on the roof may be notched, or the surface of the same that is to be exposed may be ornamented in various ways to improve its appearance by methods mentioned above or already known in this art.

As a specific example, it may be mentioned that the shingle strips of this invention may be cut in all the ways indicated in Figs. 3 to 6 inclusive from a sheet of roofing material 40 inches wide, so as to obtain shingle strips 32 inches long, having the wider portion 8 inches long without any waste of material whatever.

I claim:—

1. The process which comprises cutting a rectangle from a sheet of roofing material, cutting a rectangle from the center of said first named rectangle, and cutting the remaining portion so as to form four shingle strips, each having one end wider than the other.

2. The process which comprises cutting a rectangle from a sheet of roofing material, cutting a rectangle from the center of said first named rectangle, and cutting the remaining portion along lines perpendicular to the edges at distances from the corners slightly greater than the width of said remaining portion.

3. The process which comprises cutting a square from a sheet of roofing material, cutting a square from the center of said first named square, and cutting the remaining portion so as to form four shingle strips each having one end wider than the other.

4. The process which comprises cutting a rectangle from a sheet of roofing material, cutting a rectangle from the center of said first named rectangle, cutting the remaining portion so as to form four shingle strips each having one end wider than the other, and cutting said smaller rectangle into rectangular shingles.

5. The process which comprises cutting a square from a sheet of roofing material, cutting a square from the center of said first named square, and cutting the remaining portion along lines perpendicular to the edges at distances approximately one-fourth the distance from one corner to the other.

In testimony whereof I affix my signature.

CHARLES W. MORTIMER.